United States Patent [19]

Yamaura et al.

[11] 4,420,805
[45] Dec. 13, 1983

[54] PROTECTIVE RELAYING SYSTEM

[75] Inventors: Mitsuru Yamaura, Hachiooji; Ryotaro Kondow, Tokyo; Junichi Inagaki, Fuchu, all of Japan

[73] Assignee: Tokyo Shibaura Denki Kabushiki Kaisha, Kawasaki, Japan

[21] Appl. No.: 236,602

[22] Filed: Feb. 20, 1981

[30] Foreign Application Priority Data

May 20, 1980 [JP] Japan .................................. 55-65882

[51] Int. Cl.³ ............................................. G06F 15/20
[52] U.S. Cl. ...................................... 364/184; 361/79; 364/186; 364/483
[58] Field of Search ............... 364/483, 492, 481, 184, 364/186; 361/78, 79, 80, 83, 86, 87, 90, 91, 92, 93, 94, 110; 371/67, 14, 20, 23, 25; 324/51, 52

[56] References Cited

U.S. PATENT DOCUMENTS

| | | | |
|---|---|---|---|
| 4,219,858 | 8/1980 | DePuy et al. | 364/483 X |
| 4,272,816 | 6/1981 | Matsumoto | 364/483 |
| 4,276,605 | 6/1981 | Okamoto et al. | 364/483 |
| 4,291,355 | 9/1981 | Dinger | 364/492 X |
| 4,300,182 | 11/1981 | Schweitzer | 364/483 X |
| 4,321,647 | 3/1982 | Fordham | 364/483 X |
| 4,333,151 | 6/1982 | Matsushima | 364/483 X |
| 4,335,437 | 6/1982 | Wilson et al. | 364/483 |
| 4,344,143 | 8/1982 | Kurosawa et al. | 361/80 X |

*Primary Examiner*—Joseph F. Ruggiero
*Attorney, Agent, or Firm*—Oblon, Fisher, Spivak, McClelland & Maier

[57] ABSTRACT

A protective relaying system is disclosed which includes a selection circuit for receiving a plurality of input signals from a power system and for selecting one of the input signals to provide a selected input signal. The system also includes a comparison circuit connected to the selection circuit for receiving the selected input signal, comparing the selected input signal with a predetermined reference signal, and producing a decision signal according to the result of the comparison. The system further includes a processing unit connected to the comparison circuit for receiving the decision signal and processing the decision signal to produce a relay output signal.

25 Claims, 16 Drawing Figures

PROTECTIVE RELAYING SYSTEM

BACKGROUND OF THE INVENTION

1. Field of the Invention

This invention relates in general to a protective relaying system and, more particularly, to a protective relaying system utilizing a digital computer for protecting an electric power system.

2. Description of the Prior Art

Recently a protective relaying system using a digital computer, such as a mini-computer or a microcomputer, has been developed which utilizes modern digital techniques. In such a protective relaying system using a digital computer, hereinafter referred to as a digital protective relaying system, an electrical quantity in an electric power system is converted into a digital quantity and a relay decision is made by processing the digital quantity in the digital computer. FIG. 1 is a block diagram illustrating one example of a conventional digital protective relaying system 100. In FIG. 1, a plurality of information quantities regarding voltages and currents of the electric power system are applied to input transformers (not shown) so as to be converted into signals Vi of suitable amplitude for use by filters 1. The signals Vi are applied to the filters 1 so that the fundamental wave components thereof are picked up. The output signals of the filters 1 are applied to sample and hold circuits 2 where the signals are held for a predetermined time and simultaneously sampled. The output signals of the sample and hold circuits 2, the so-called "sampled data", are applied to a multiplexer 3 to be selected consecutively and to be sent serially to an analog to digital converter 4. The applied serial signals are converted into digital signals in the analog to digital converter 4 and applied to a central processing unit 6 through a direct memory access control circuit 5. The central processing unit 6 executes a relaying calculation on the applied data expressing the information regarding voltages and currents of the electric power system, and produces a relay output signal Vo according to the results of the relaying calculation.

The digital protective relaying system 100 shown in FIG. 1 can execute relay decisions regarding many elements. For example, a distance protective relaying system for transmission lines having up to approximately one hundred elements can be embodied in the digital protective relaying system 100 shown in FIG. 1. Moreover, the digital protective relaying system 100 is advantageous in that standardization of hardware can be promoted because modification of the method of protection can be achieved by modifying the program of the digital computer. However, a malfunction in a protective relaying system for protecting an electric power system has an extremely large effect on the electric power system and thus can cause serious problems. To avoid this, a protective relay for fail safe use (hereinafter referred to as a fail safe relay) is provided in the protective relaying system. For example, in a distance protective relaying system, an overcurrent relay, an overvoltage relay, and an undervoltage relay are used as fail safe relays. Most of these fail safe relays are of a type such that a single electrical quantity is utilized in making a relay decision and that relay decision is executed by simple processing. Therefore, in the case of a protective relaying system where a single electrical quantity is utilized in making a relay decision, such as a fail safe relay, using a digital computer, the protective relaying system having a construction as shown in FIG. 1 has more processing capacity than necessary. This means that the system has more circuitry than it needs and thus is wasteful. Moreover, the digital protective relaying system with more circuitry than necessary is not only expensive but also has an unnecessarily high power consumption which generates much heat. The heat has an adverse effect on the digital computer which is mainly made of integrated circuits. Moreover, it is not good from a reliability standpoint to use many parts in the digital protective relaying system.

As described above, according to conventional techniques, it has been very difficult to construct a digital protective relaying system having suitable processing capacity where a single electrical quantity is utilized in making a relay decision, such as a fail safe relay, using a digital computer.

SUMMARY OF THE INVENTION

Accordingly, one object of this invention is to provide a novel protective relaying system of suitable processing capacity wherein a single electrical quantity is utilized in making a relay decision.

Another object of this invention is to provide a protective relaying system having a suitable processing capability.

Still another object of this invention is to provide a protective relaying system having a suitable processing capacity for a fail safe relay.

Another object of this invention is to provide a protective relaying system which includes a digital computer having a low processing capacity.

Still another object of this invention is to provide a protective relaying system which includes a digital computer having a small number of parts.

Another object of this invention is to provide a protective relaying system which provides reduced power consumption as compared to prior art devices.

Still another object of this invention is to provide a protective relaying system having improved reliability characteristics as compared to prior art devices.

Still a further object of this invention is to provide a protective relaying system which is small in size.

Another object of this invention is to provide a protective relaying system having improved hardware standardization characteristics as compared to prior art devices.

Still another object of this invention is to provide a protective relaying system having improved relay operation time characteristics.

Another object of this invention is to provide a protective relaying system which can check a preset reference value.

Still another object of this invention is to provide a protective relaying system which can check its own hardware automatically, thereby reducing the task of periodic inspections.

Still another object of this invention is to provide a protective relaying system wherein a relay decision can be executed precisely.

These and other objects of this invention are achieved by a protective relaying system including a selection circuit for receiving a plurality of input signals and for selecting one of the input signals to produce a selected input signal. A comparison circuit is connected to the selection circuit for receiving the selected input signal and comparing the selected input signal with a predetermined reference signal to produce a decision signal according to the result of the comparison. The system also includes a processing unit connected to the comparison circuit to receive the decision signal and to process the decision signal to produce a relay output signal.

Moreover, these and other objects of this invention are achieved by a protective relaying system including a selection circuit for receiving a plurality of input signals and for selecting one of the input signals to produce a selected input signal, and a reference output circuit for producing a reference signal. The system also includes a comparison circuit connected to the selection circuit for receiving the selected input signal and connected to the reference output circuit for receiving the reference signal. The comparison circuit compares the selected input signal with the reference signal and produces a decision signal according to the result of the comparison. The system further includes a processing unit connected to the comparison circuit for receiving the decision signal and for processing the decision signal to produce a relay output signal.

These and other objects of this invention are also achieved by a protective relaying system including a selection circuit for receiving a plurality of input signals and selecting one of the input signals to produce a selected input signal, and a digital to analog converter circuit for receiving a digital reference signal and converting the digital reference signal into an analog reference signal. The system also includes a comparison circuit connected to the selection circuit for receiving the selected input signal and connected to the digital to analog converter for receiving the analog reference signal. The comparison circuit compares the selected input signal with the analog reference signal and produces a decision signal according to the result of the comparison. The system further includes a processing unit connected to the comparison circuit for receiving the decision signal and processing the decision signal to produce a relay output signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
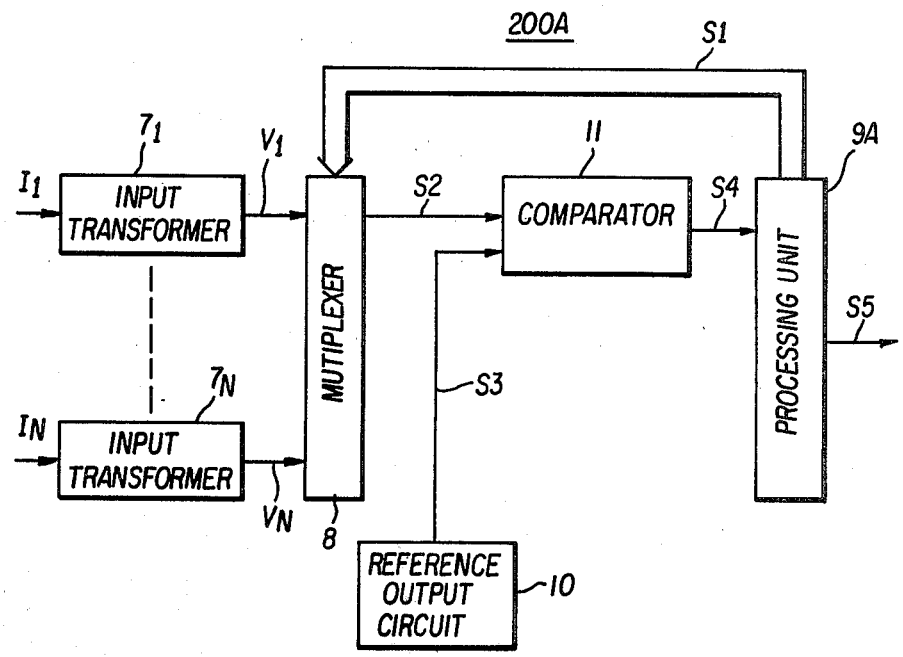
FIG. 2 is a block diagram showing a protective relaying system according to a preferred embodiment of this invention.

Referring now to the drawings, wherein like reference numerals designate identical or corresponding parts throughout the several views, and more particularly to FIG. 2 thereof, a protective relaying system 200A according to a preferred embodiment of this invention is shown. In this system input transformers $7_1$ through $7_N$ are provided for receiving input voltage or current information $I_1$ through $I_N$ from an electric power system and for converting this information into voltage signals $V_1$ through $V_N$ of suitable amplitude for processing in the following stages. A selection device, such as for example a multiplexer 8, is connected to the outputs of the input transformers $7_1$ through $7_N$ for receiving the voltage signals $V_1$ through $V_N$ and for selecting one of the voltage signals $V_1$ through $V_N$ to produce a selected input signal S2, as determined by a selection signal S1 from a processing unit 9A. The system also includes a reference output circuit 10 which produces a reference signal S3. A comparator 11 is connected to the output of the multiplexer 8 for receiving the selected input signal S2 and is connected to the reference output circuit 10 for receiving the reference signal S3. The comparator 11 compares the selected input signal S2 with the reference signal S3 and produces a decision signal S4 according to the result of the comparison. The decision signal S4 is a digital signal determined as follows: when $S2 \geq S3$, S4 is a logic "1", and when $S2 < S3$, S4 is a logic "0". The processing unit 9A is connected to the output of the comparator 11 for receiving the decision signal S4. The processing unit 9A processes the decision signal S4 based on a predetermined program and produces a relay output signal S5 according to the result of the relay decision. The processing unit 9A can be constructed with a microcomputer or other suitable device.

Figure 3:
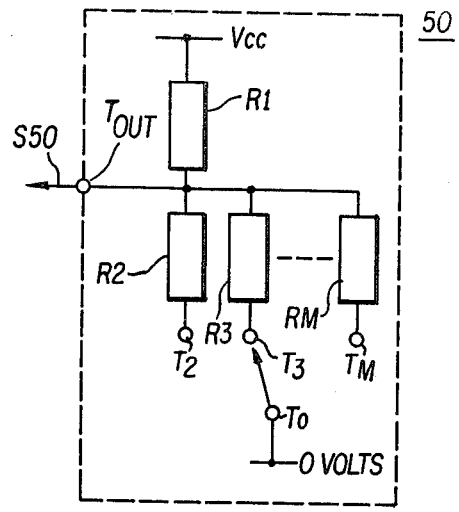
FIG. 3 is a circuit diagram showing a reference voltage circuit for producing a reference signal.

FIG. 3 illustrates a reference voltage circuit 50 for producing a reference voltage S50. The reference output circuit 10 shown in FIG. 2 includes one reference voltage circuit 50, and the reference voltage signal S50 is used as the reference signal S3. The reference voltage circuit 50 of FIG. 3 includes a first resistor R1 and second through Mth resistors, R2 through RM. One terminal of the first resistor R1 is connected to a power source Vcc. The other terminal of the first resistor R1 is connected to one terminal of each of the second through Mth resistors, R2 through RM, and to an output terminal Tout where the reference voltage signal S50 is produced. A terminal To is coupled to a source of zero voltage, such as ground. The other terminals $T_2$ through $T_M$ of the second through Mth resistors, R2 through RM are in an open circuit condition except for one selected terminal thereof which is connected to the terminal To. Therefore, the reference voltage signal S50 is determined by dividing the voltage between the power source Vcc and ground by the ratio of the first resistor R1 and the selected resistor, R2 through RM, connected to ground. Thus (M−1) reference voltage signals S50 can be obtained by using various combinations of the first resistor R1 and the second through Mth resistors, R2 through RM. The reference voltage circuit 50 is not restricted to the circuit shown in FIG. 3, but can be embodied in other circuits where the reference voltage can be adjusted as is apparent to those skilled in the art.

Hereinafter, the operation of the protective relaying system 200A shown in FIG. 2 will be described in detail. In FIG. 2, the input voltage or current information (hereinafter referred to as the relay input signals) $I_1$ through $I_N$ is converted into the voltage signals $V_1$ through $V_N$ in the input transformers $7_1$ through $7_N$ which are applied to the multiplexer 8. One of the voltage signals $V_1$ through $V_N$ is selected based on the selection signal S1 from the processing unit 9A. This signal is applied to the comparator 11 as the selected input signal S2. In the comparator 11, the selected input signal S2, which is a voltage signal corresponding to one of the relay input signals $I_1$ through $I_N$, is compared with the reference signal S3 applied from the reference output circuit 10. The result of the comparison produced by the comparator 11 is applied to the processing unit 9A as the decision signal S4. Here a plurality of relay input signals $I_1$ through $I_N$ are sequentially selected in the multiplexer 8 and compared with the reference signal S3 in the comparators 11 such that the decision signals S4 corresponding to the relay input signals $I_1$ through $I_N$ are sequentially applied to the processing unit 9A over a constant time interval.

Figure 4A:
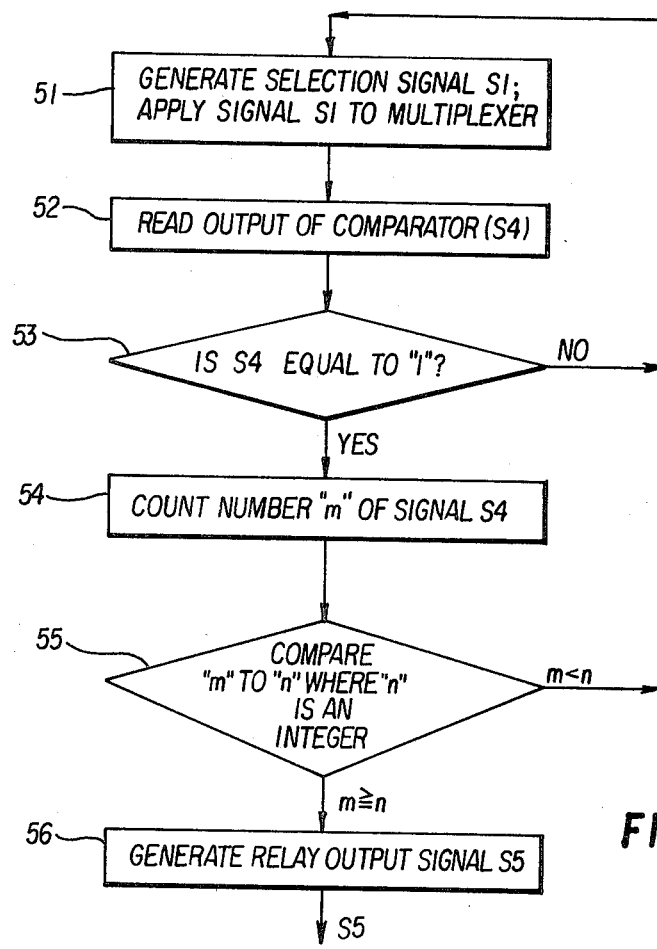
FIG. 4(A) is a flow chart illustrating an operation executed in the processing unit 9A shown in FIG. 2.

The processing unit 9A applies the selection signal S1 to the multiplexer 8, receives the decision signal S4 of the comparator 11, and produces the relay output signal S5. FIG. 4(A) is a flow chart illustrating an example of the operation performed in the processing unit 9A for one relay input signal out of the plurality of relay input signals $I_1$ through $I_N$. In FIG. 4(A), the processing unit 9A generates the selection signal S1 for selecting one of the relay input signals $I_1$ through $I_N$ in the multiplexer 8 in step 51. The relay input signal to be examined for a relay decision is selected in the multiplexer 8 by the selection signal S1 and is applied to the comparator 11 as the selected input signal S2. The selected input signal S2 is compared with the reference signal S3 in the comparator 11 and the decision signal S4 is generated according to the result of the comparison. Next, the processing unit 9A reads the decision signal S4 in step 52. In step 53, when the decision signal S4 is "0", the relay input signal is smaller than the reference value S3, and the processing goes back to the step 51 to examine the next input signal. In step 53, when the decision signal S4 is "1", the relay input signal is equal to or larger than the reference value and the processing step goes to the next step 54. In steps 54 and 55, the processing for a relay decision is executed. In step 54, the number "m" of the decision signal S4 is counted. In step 55, the counted number m is compared with a predetermined integer "n". When the number m is smaller than the integer n, the processing step goes back to the step 51; but when the number m is equal to or larger than the integer n, the processing goes to step 56, where the relay output signal S5 is generated. The object of counting the number m of the decision signal S4 in step 54 is to prevent malfunctions due to noises or other causes. The relay output signal S5 is generated only when the decision signal S4 becomes "1" consecutively, n times or more. Therefore, when the counted number m is smaller than n, the relay output signal S5 is not generated.

Figure 4B:
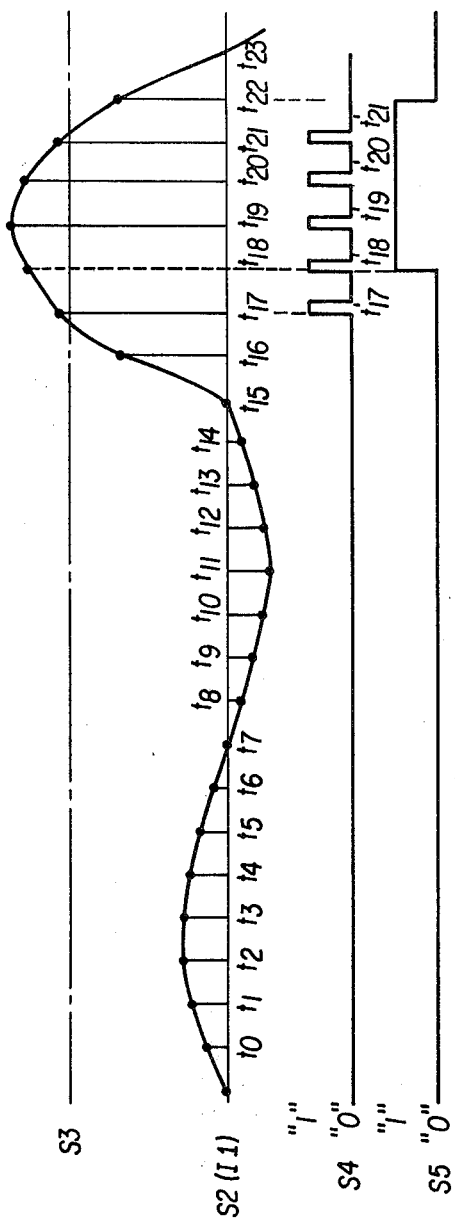
FIG. 4(B) illustrates waveforms used to explain the operation of the protective relaying system shown in FIG. 2.

Hereafter, the operation of the protective relaying system 200A will be described in detail using FIG. 4(B) which illustrates the decision making process for a single input signal $I_1$. In FIG. 4(B), times $t_0$ through $t_{23}$ illustrates the times when the relay decision regarding the relay input signal $I_1$ is executed in the processing unit 9A. The relay input signal $I_1$ is in a steady state from a time $t_0$ to a time $t_{15}$. After the time $t_{15}$ the relay input signal $I_1$ begins to increase due to a fault generated in the electric power system. Up to the time $t_{15}$, the relay input signal $I_1$ is in a steady state and the decision signal S4 is "0" because the reference signal S3 is larger than the relay input signal $I_1$. Therefore, the relay output signal S5 continues to be "0". Strictly speaking, the relay input signal $I_1$ is not compared with the reference signal S3 directly; rather, the relay input signal $I_1$ is converted into the voltage signal $V_1$. When the voltage signal $V_1$ is selected in the multiplexer 8, $V_1$ becomes the selected input signal S2. The selected input signal S2 is compared with the reference signal S3. Therefore, the relay input signal $I_1$ in FIG. 4(B) shows the selected input signal S2 which corresponds to the voltage signal $V_1$. However, for the purpose of simplifying the explanation, the term "relay input signal $I_1$" is used instead of the term "selected input signal S2" only in the explanation using FIG. 4(B), which will not be confusing to those skilled in the art.

At the time $t_{15}$, the relay input signal $I_1$ starts to increase due to the faults generated in the electric power system. At the time $t_{16}$, after the fault generation, the relay input signal $I_1$ is still smaller than the reference signal S3, so that the decision signal S4 and the relay output signal S5 continue to be "0" as in the steady state condition. At a time $t_{17}$, as the relay input signal $I_1$ becomes larger than the reference signal S3, the decision signal S4 has the state of logic "1" only when the comparison regarding the relay input signal $I_1$ is performed in the comparator 11, for example during the time between $t_{17}$ and $t'_{17}$. After the time $t'_{17}$, the decision signal S4 regarding the other relay input signals $I_2$ through $I_N$ will be generated. FIG. 4(B) illustrates the case where the other relay input signals $I_2$ through $I_N$ are in a steady state condition. Here, the processing unit 9A generates the relay output signal S5 having a logic "1" only when the decision signal S4 regarding the relay input signal $I_1$ becomes "1" consecutively for n times. In the case of FIG. 4(B), n is 2. Therefore, at the time $t_{17}$, the relay output signal S5 continues to be "0". At the time $t_{18}$, as the decision signal S4 becomes "1" again, the processing unit 9A generates the relay output signal S5 of "1". The relay output signal S5 continues to be a logic "1" until the time $t_{22}$. At the time $t_{22}$, as the relay input signal $I_1$ becomes smaller than the reference signal S3, the decision signal S4 is "0" and the relay output signal S5 returns to "0".

As can be understood from the flow chart in FIG. 4(A), the steps for processing one relay input are small such that the processing time thereof is also very small. Usually each step shown in FIG. 4(A) is executed within a time span of a few microseconds up to approximately one hundred microseconds in a microcomputer. For example, if the average execution time of each step is assumed to be 10 microseconds and the predetermined integer n is assumed to be 2, the processing time for generating the relay output signal S5 is 110 microseconds, because the number of necessary steps is eleven. Here, the operation times in both the multiplexer 8 and the comparator 11 are very small compared with the execution time in the processing unit 9A. Similarly, when three relay input signals are to be executed for a relay decision, the processing time is 330 microseconds, which is also very small in comparison with a half cycle time of the relay input signals (10 milliseconds for the case of a 50 Hz power system frequency). When a plurality of relay input signals are processed repeatedly as described above, the relay decision for each relay input signal is repeated in a very short time. Therefore, the relay decision for each relay input signal can be executed with a small error.

The operations performed in the processing unit 9A are not restricted to the method shown in FIG. 4(A), and thus other methods can be used, as is apparent to those skilled in the art.

Figure 1:
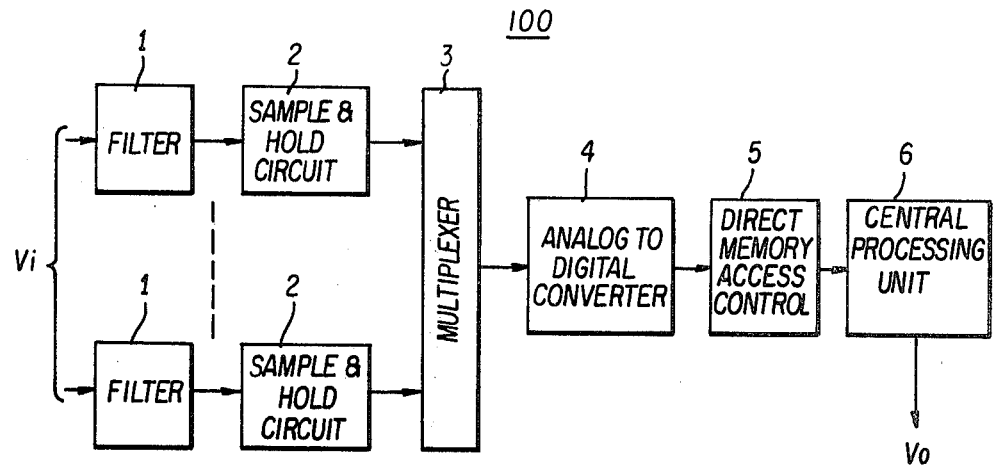
FIG. 1 is a block diagram showing one example of a conventional digital protective relaying system.

As described above, the number of steps executed in the processing unit 9A in the protecting relaying system 200A of FIG. 2 is much smaller than that of the central processing unit 6 in the conventional protective relaying system 100 of FIG. 1. Therefore, the processing unit 9A can be smaller and the protective relaying system 200A can use a digital computer whose processing capacity is lower and slower than that of the conventional central processing unit 6. Thus a micro-computer which has a complete digital processing capability, a so-called one-chip micro-computer, can be used as the processing unit 9A in the protective relaying system 200A according to the present invention.

As described above, this invention provides a protective relaying system having a suitable processing capacity wherein a single electrical quantity is analyzed for a relay decision using a digital computer. This invention can also provide a protective relaying system having a suitable processing capability for a fail safe relay. This invention can provide a protective relaying system which can provide reduced power consumption, improved reliability characteristics, and a reduction in size, thereby improving standardization of the hardware.

Figure 5:
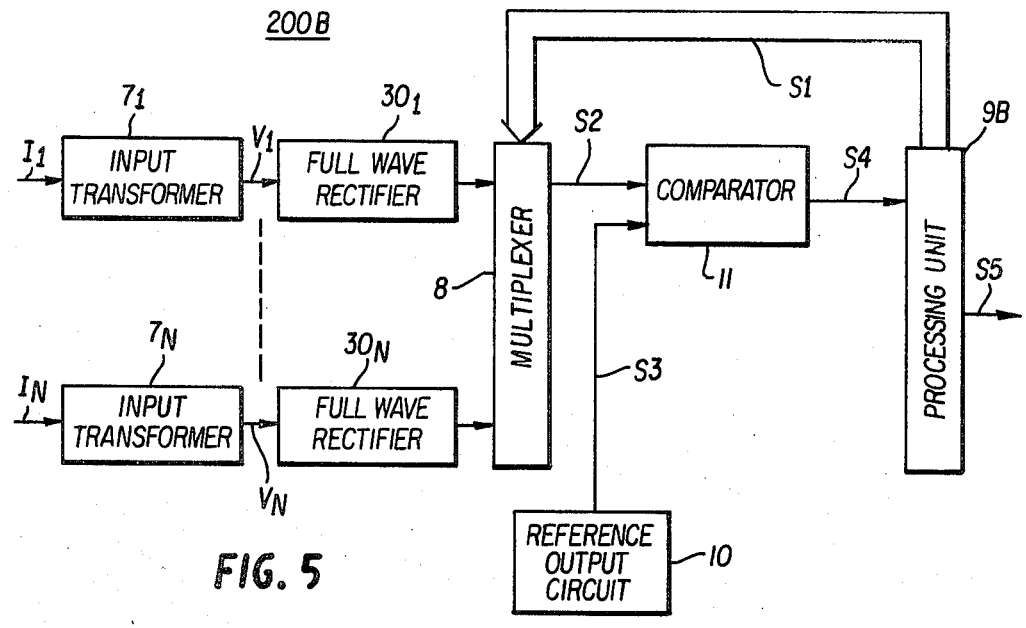
FIGS. 5, 6 and 7 are block diagrams showing protective relaying systems according to other preferred embodiments of this invention.

This invention is not restricted to the embodiments shown in FIG. 2, but can be embodied in various other protective relaying systems described hereinafter. FIG. 5 shows a protective relaying system 200B according to another embodiment of this invention. The system of FIG. 5 includes a plurality of full-wave rectifiers $30_1$ through $30_N$ located between the input transformers $7_1$ through $7_N$ and the multiplexer 8. The remaining portions of the protective relaying system 200B are the same as those of the protective relaying system 200A shown in FIG. 2. The voltage signals $V_1$ through $V_N$ appearing at the outputs of the input transformers $7_1$ through $7_N$ are full-wave rectified in the full-wave rectifiers $30_1$ through $30_N$ and are applied to the multiplexer 8 where one of the rectified signals is selected to produce the selected input signal S2. Therefore, the selected input signal S2 corresponds to the full-wave rectified signal of one of the relay input signals $I_1$ through $I_N$. In the system of FIG. 2, the selected input signal S2 is executed for a relay decision only when the polarity thereof is the same as that of the reference signal S3; that is, only a half wave of the selected input signal S2 is executed for a relay decision in the comparator 11. On the other hand, in the system of FIG. 5, both half waves of each cycle of the selected input signal S2 can be executed for a relay decision in the comparator 11. Therefore, according to the protective relaying system 200B, the relay operation time can be reduced.

Figure 6:
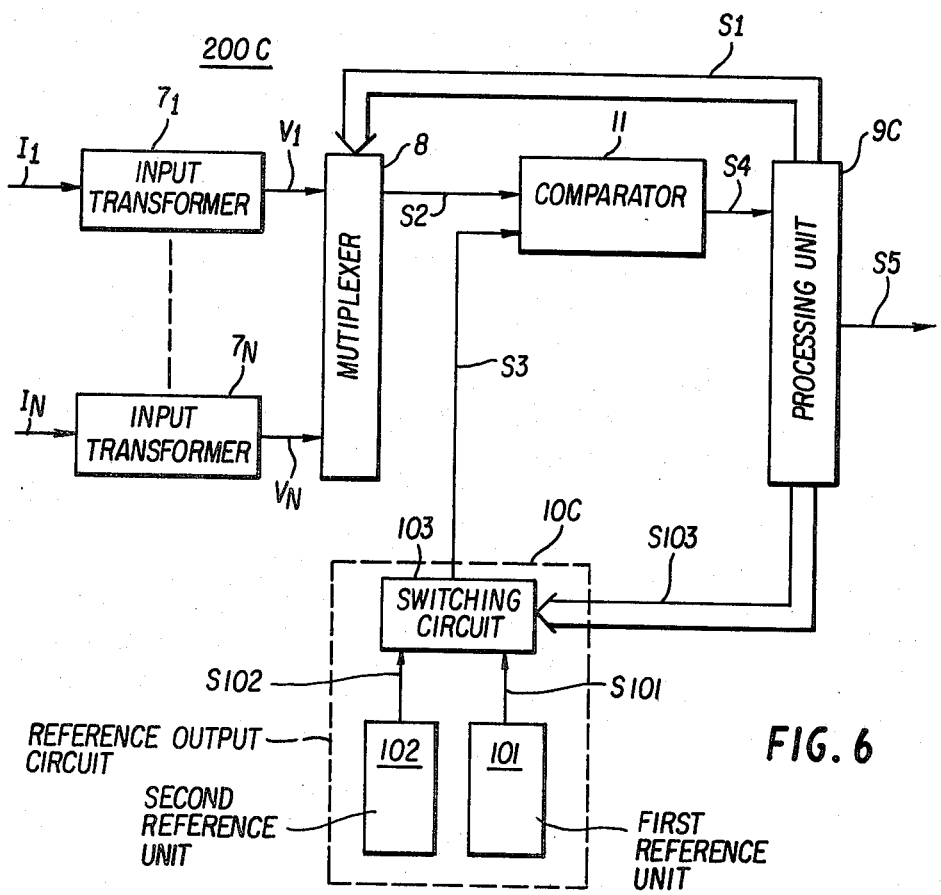

FIG. 6 illustrates a protective relaying system 200C according to still another embodiment of this invention. The system of FIG. 6 includes a processing unit 9C and a reference output circuit 10C instead of the processing unit 9A and the reference output circuit 10 shown in FIG. 2. The processing unit 9C includes all the functions of the processing unit 9A and also has the capability of producing a switching signal S103. The reference output circuit 10C has a first reference unit 101 for producing a first reference signal S101, a second reference unit 102 for producing a second reference signal S102, and a switching circuit 103. The switching circuit 103 is connected to the first and second reference units 101, 102 for receiving the first and second reference signals S101, S102, respectively, and is also connected to the processing unit 9C for receiving the switching signal S103. The switching circuit 103 selects one of the first and second reference signals S101, S102 according to the switching signal S103 to produce the reference signal S3 which is applied to the comparator 11. The first and second reference units 101, 102 can be embodied by, for example, the reference voltage circuit 50 shown in FIG. 3. The remaining portions of the protective relaying system 200C are the same as those of the protective relaying system 200A shown in FIG. 2. Since the protective relaying system 200C includes two kinds of reference signals S101, S102 in the first and second reference units 101, 102, the system can form two kinds of protective relays, such as, for example, an overcurrent relay and an undervoltage relay. The operation of the processing unit 9C is achieved by adding a step for outputting the switching signal S103 prior to the step 51 in the flow chart shown in FIG. 4. Two reference units 101, 102 are included in the protective relaying system 200C; however, three or more reference units can be included in the protective relaying system according to this invention, as is apparent to those skilled in the art.

Figure 7:
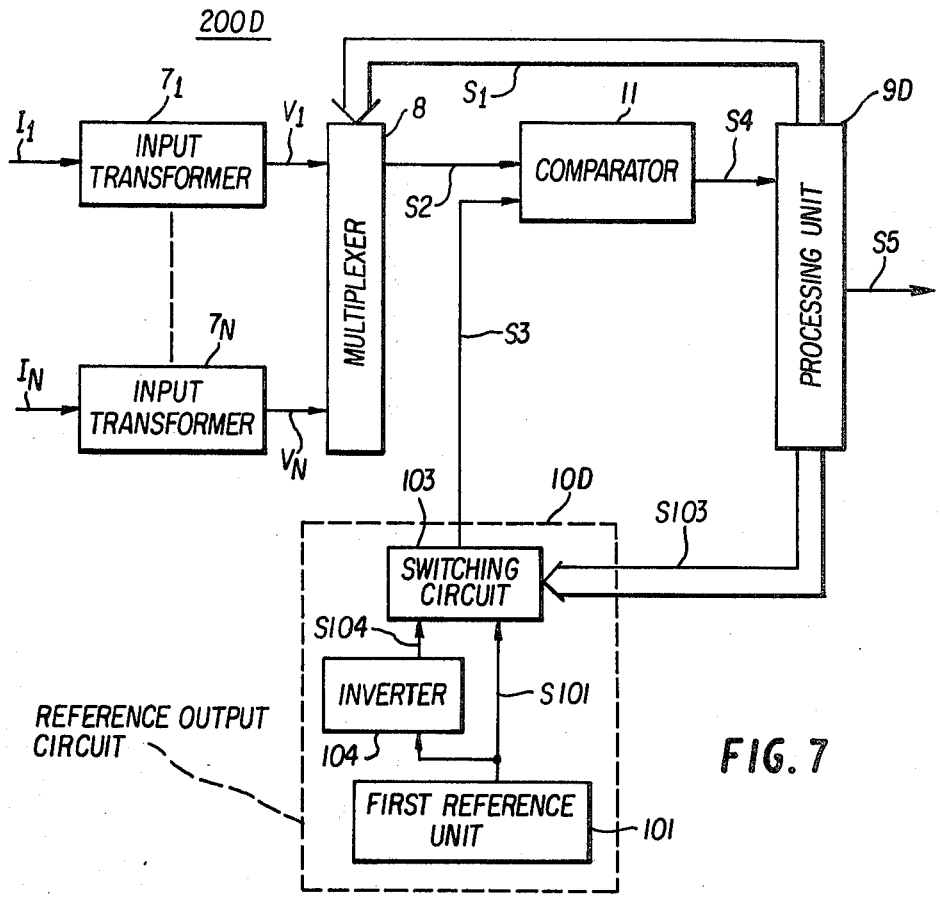

FIG. 7 illustrates protective relaying system 200D according to another embodiment of this invention. The system of FIG. 7 includes a processing unit 9D and a reference output circuit 10D in place of the processing unit 9A and the reference output circuit 10 shown in FIG. 2. The processing unit 9D includes the functions described below and includes the capability for producing the switching signal S103. The reference output circuit 10D includes a first reference unit 101, an inverter 104 connected to the first reference unit 101 for receiving the first reference signal S101 and for inverting the first reference signal S101 to produce an inverted reference signal S104, and a switching circuit 103. The first reference unit 101 and the switching circuit 103 are the same as the circuits described with respect to the system of FIG. 6. The switching circuit 103 selects either the first reference signal S101 or the inverted reference signl S104 according to the switching signal S103 to produce the reference signal S3 which is applied to the comparator 11. The remaining portion of the protective relaying system 200D are the same as those of the system 200A shown in FIG. 2. According to the protective relaying system 200D shown in FIG. 7, since the reference signal S3, consisting of two polarities (positive and negative), can be used in the comparator 11, the relay operation time in the protective relaying system 200D can be reduced as in the protective relaying system 200B shown in FIG. 5.

Figure 8:
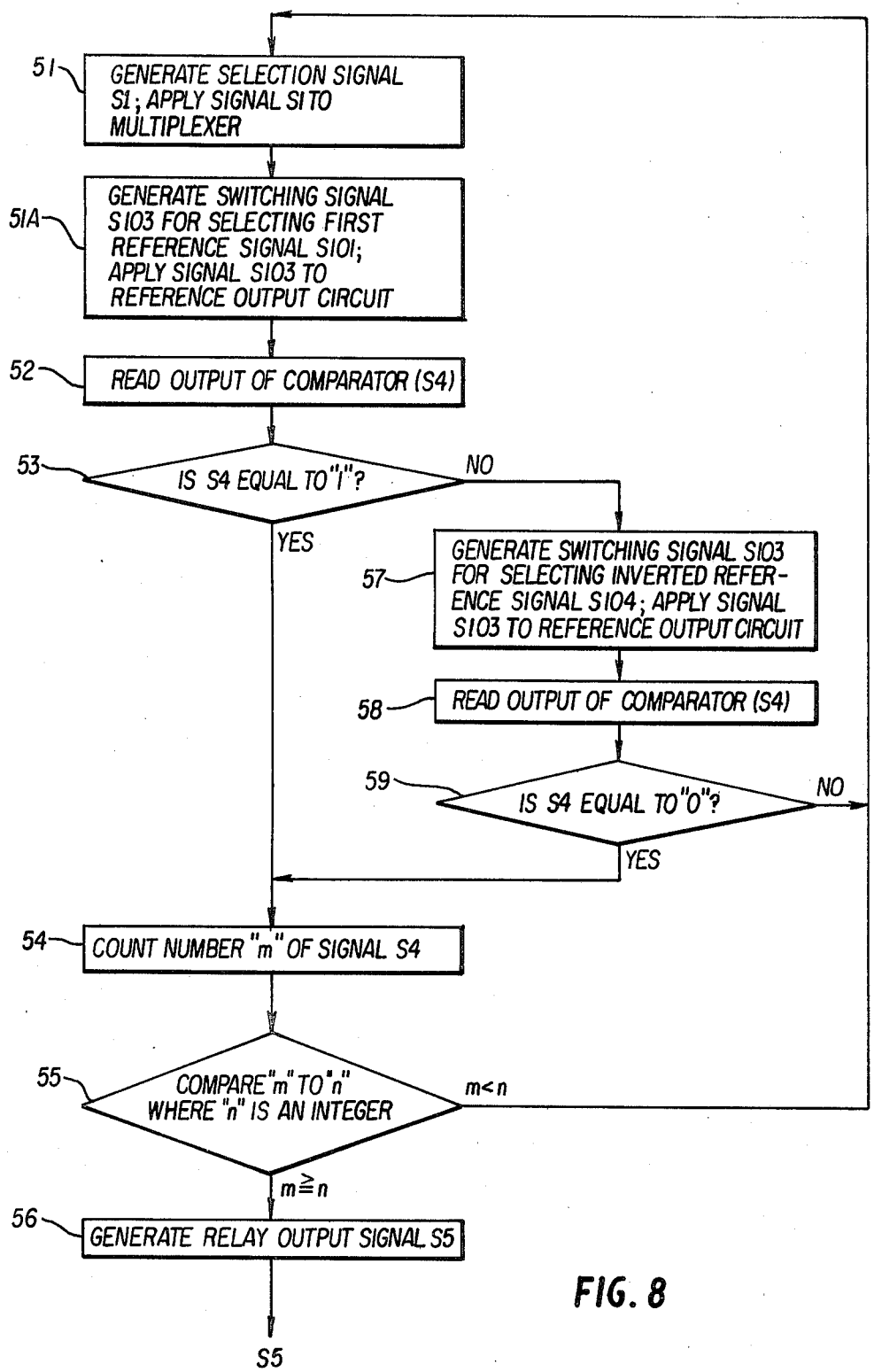
FIG. 8 is a flow chart illustrating an operation executed in the processing unit 9D shown in FIG. 7.

Next, the operations executed in the processing unit 9D will be described in detail. FIG. 8 shows a flow chart illustrating an example of the operations performed in the processing unit 9D regarding only one relay input signal out of a plurality of relay input signals $I_1$ through $I_N$. In FIG. 8, the processing unit 9D generates the selection signal S1 in the step 51. In step 51A, the processing unit 9D generates the switching signal S103 for selecting the first reference signal S101. The comparator 11 compares the selected input signal S2 and the reference signal S3 which corresponds to the first reference signal S101 and produces the decision signal S4 according to the result of the comparison. Steps 52 and 53 are identical to those described above with respect to FIG. 4(A). In step 53, when the decision signal S4 is "0", the processing goes to step 57; however, when the decision signal S4 is "1" the processing goes to step 54. In step 57, the processing unit 9D generates the switching signal S103 for selecting the inverted reference signal S104. Then the comparator 11 compares the selected input signal S2 and the reference output signal S3 which corresponds to the inverted reference signal S104 and produces the decision signal S4 according to the result of the comparison. In step 58, the processing unit 9D reads the decision signal S4. In step 59, when the decision signal S4 is "1", the absolute value of the relay input signal is equal to or smaller than the absolute value of the reference value and the processing goes back to step 51 to examine the next input signal. In step 59, when the decision signal S4 is "0", the absolute value of the relay input signal is larger than the absolute value of the reference value and the processing goes to step 54. Steps 54 through 56 are identical to those described above with respect to FIG. 4(A).

Figure 9:
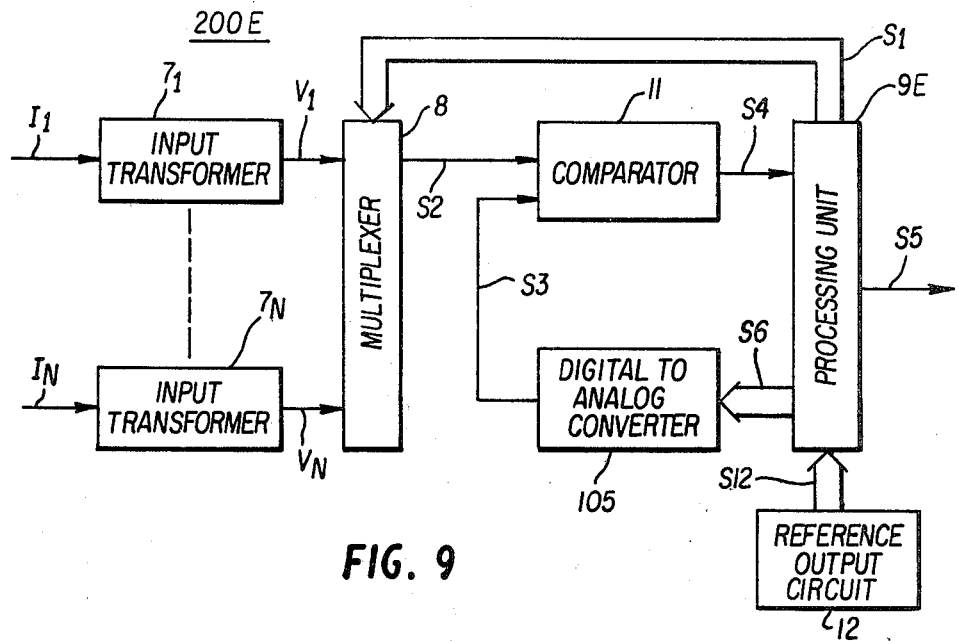
FIG. 9 through FIG. 14 are block diagrams illustrating protective relaying systems according to still other preferred embodiments of this invention.

FIG. 9 illustrates a protective relaying system 200E according to still another embodiment of the invention. The system of FIG. 9 includes a processing unit 9E, a digital to analog converter 105, and a reference output circuit 12 in place of the processing unit 9A and the reference output circuit 10 shown in FIG. 2. The reference output circuit 12 produces a digital signal S12. The processing unit 9E is connected to the reference output circuit 12 for receiving the digital signal S12. The processing unit 9E converts the digital signal S12 into a digital reference signal S6 by a predetermined conversion method. First, the processing unit 9E converts the digital signal S12 into a first reference signal. The first reference signal is then inverted to form an inverted reference signal. The processing unit 9E then selects either the first reference signal or the inverted reference signal to produce the digital reference signal S6. The digital to analog converter 105 is connected to the processing unit 9E to receive the digital reference signal S6 and converts the digital reference signal S6 into an analog signal which is applied to the comparator as the reference signal S3. The processing unit 9E operates according to the flow chart shown in FIG. 8 with the exception that in step 51A the digital reference signal S6, corresponding to the first reference signal, is produced instead of the switching signal S103, and in step 57 the digital reference signal S6, corresponding to the inverted reference signal, is produced instead of the switching signal S103. The processing steps for receiving the digital signal S12, converting the digital signal S12 into the digital reference signal S6 are also added. The remaining portions of the protecting relaying system 200E are the same as those of the protective relaying system 200A shown in FIG. 2. The reference output circuit 12 can be constructed with digital switches, as is apparent to those skilled in the art.

According to the protective relaying system 200E, as the digital signal S12 is applied to the processing unit 9E, the digital signal S12 can be checked easily in the processing unit 9E. Also, since an appropriate value for checking the hardware can be applied to the comparator 11, hardware in the protective relaying system 200E can be checked easily, thereby reducing the task of periodic inspection of the protective relaying systems 200E. The reference signal S3, consisting of two polarities, can be used in the comparator 11; therefore, the relay operation time in the protective relaying system 200E can be reduced as in the protective relaying system 200D shown in FIG. 7.

Figure 10:
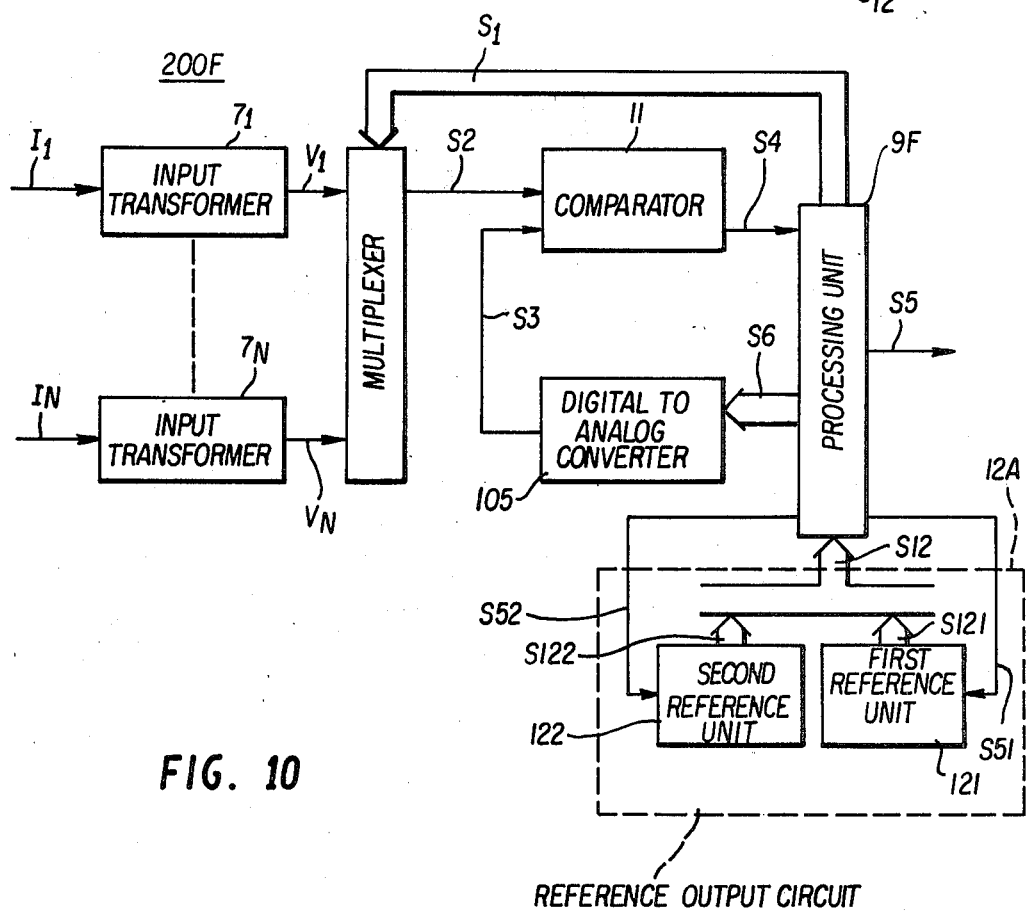

FIG. 10 shows a protective relaying system 200F according to another embodiment of this invention. The system of FIG. 10 includes a processing unit 9F, a reference output circuit 12A including two reference units, a first reference unit 121, and a second reference unit 122 instead of the processing unit 9E and the reference output circuit 12 shown in FIG. 9. The processing unit 9F includes the capability of producing a first read signal S51 and a second read signal S52. The first reference unit 121 is connected to the processing unit 9F for receiving the first read signal S51 and produces a first digital signal S121 according to the first read signal S51. The second reference unit 122 is connected to the processing unit 9F for receiving the second read signal S52 and produces a second digital signal S122 according to the second read signal S52. The processing unit 9F is connected to the reference output circuit 12A for receiving either the first digital signal S121 or the second digital signal S122 as the digital reference signal S12. The other functions of the processing unit 9F are the same as those of the processing unit 9E shown in FIG. 9. According to the protective relaying system 200F, two types of protective relays can be constructed in one protective relaying system 200F, thereby further reducing the size of the protective relaying system.

Figure 11:
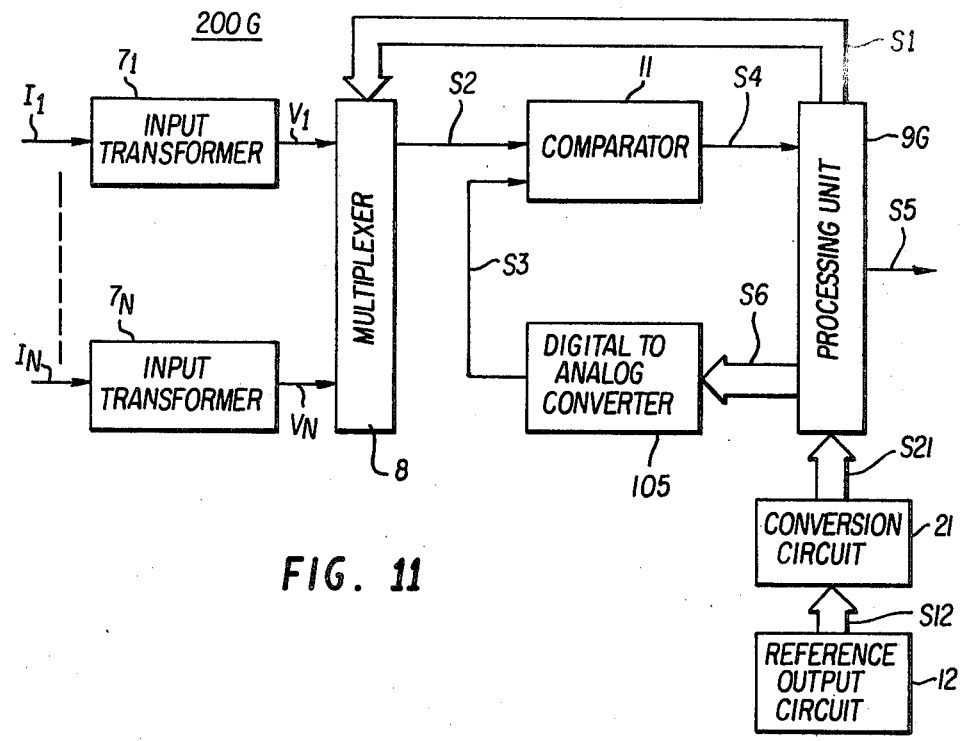

FIG. 11 illustrates a protective relaying system 200G according to still another embodiment of this invention. The system of FIG. 11 includes a processing unit 9G in place of the processing unit 9E shown in FIG. 9. A conversion circuit 21 is provided which is connected to the reference output circuit 12 for receiving the digital signal S12. The conversion circuit 21 converts the digital signal S12 into a first reference signal S21 by a predetermined conversion method, which is applied to the processing unit 9G. The predetermined conversion method is the same as that used for converting the digital signal S12 into the first reference signal in the processing unit 9E shown in FIG. 9. Therefore, the processing unit 9G receives the first reference signal S21 and inverts the first reference signal S21 to an inverted reference signal. The processing unit 9G then selects either the first reference signal S21 or the inverted reference signal to produce the digital reference signal S6. The other functions of the processing unit 9G are the same as those of the processing unit 9E shown in FIG. 9.

According to the protective relaying system 200G, it is not necessary for the processing unit 9G to convert the digital signal S12 into the first reference signal because this function is performed in the conversion circuit 21. Therefore, a digital computer can be utilized as the processing unit 9G which has a lower processing capacity than that of the processing unit 9E shown in FIG. 9, thereby providing a further reduction in size. The conversion circuit 21 is usually constructed by using a read-only memory, as is apparent to those skilled in the art.

Figure 12:
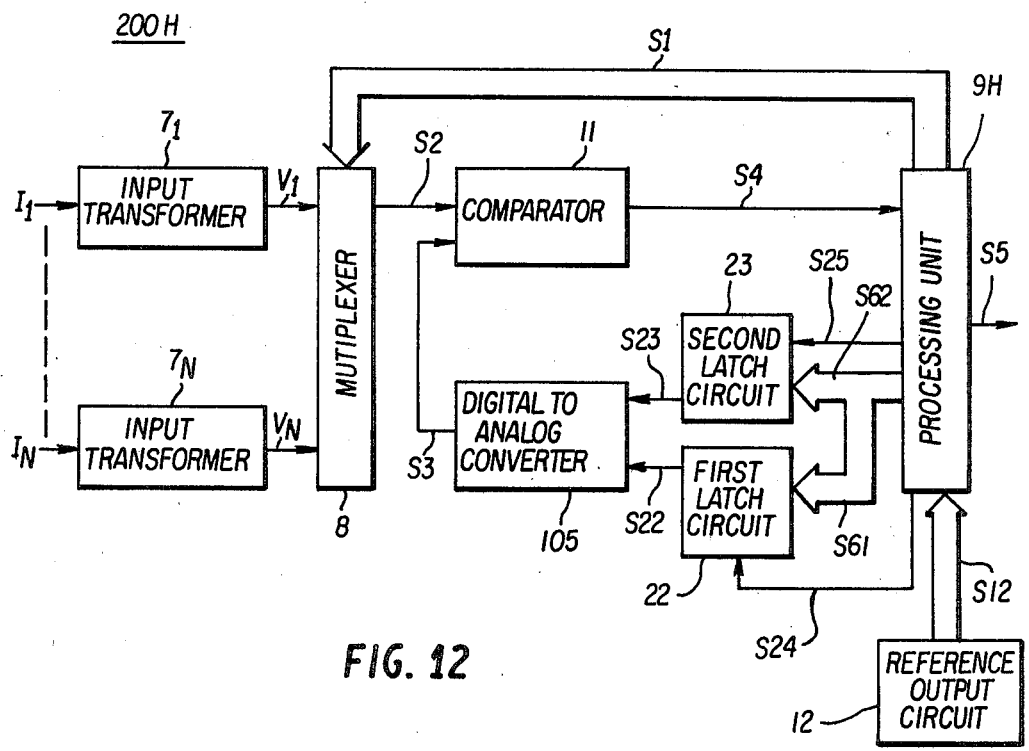

FIG. 12 shows a protective relaying system 200H according to another embodiment of this invention. The system of FIG. 12 includes a processing unit 9H in place of the processing unit 9E shown in FIG. 9. The system also includes a first latch circuit 22 and a second latch circuit 23. The processing unit 9H converts the digital signal S12 into a second digital signal having a longer bit length than the output signal bit length of the processing unit 9H. The second digital signal consists of a lower bit signal S61 and an upper bit signal S62. The processing unit 9H also includes the capability of producing a first write signal S24 and a second write signal S25. The first latch circuit 22 is connected to the processing unit 9H for receiving the lower bit signal S61 and the first write signal S24. The first latch circuit 22 latches the lower bit signal S61 to produce a lower bit reference signal S22 by receiving the first write signal S24. The second latch circuit 23 is connected to the processing unit 9H for receiving the upper bit signal S62 and the second write signal S25. The second latch circuit 23 latches the upper bit signal S62 to produce an upper bit reference signal S23 by receiving the second write signal S25. The digital to analog converter 105 is connected to the first latch circuit 22 for receiving the lower bit reference signal S22 and is connected to the second latch circuit 23 for receiving the upper bit reference signal S23. The lower bit reference signal S22 and the upper bit reference signal S23 form a digital reference signal having a longer bit length than the output signal bit length of the processing unit 9H wherein the former is the lower part and the latter is the upper part. The remaining parts of the protective relaying system 200H are the same as those of the protective relaying system 200E shown in FIG. 9.

According to the protective relaying system 200H, the reference signal S3, which is the output signal of the digital to analog converter 105, can be controlled more precisely than the reference output value of the processing unit 9H which is limited by the bit length. Therefore, the protective relaying system 200H can perform a more precise control function over a wider range than the protective relaying system 200E shown in FIG. 9.

Figure 13:
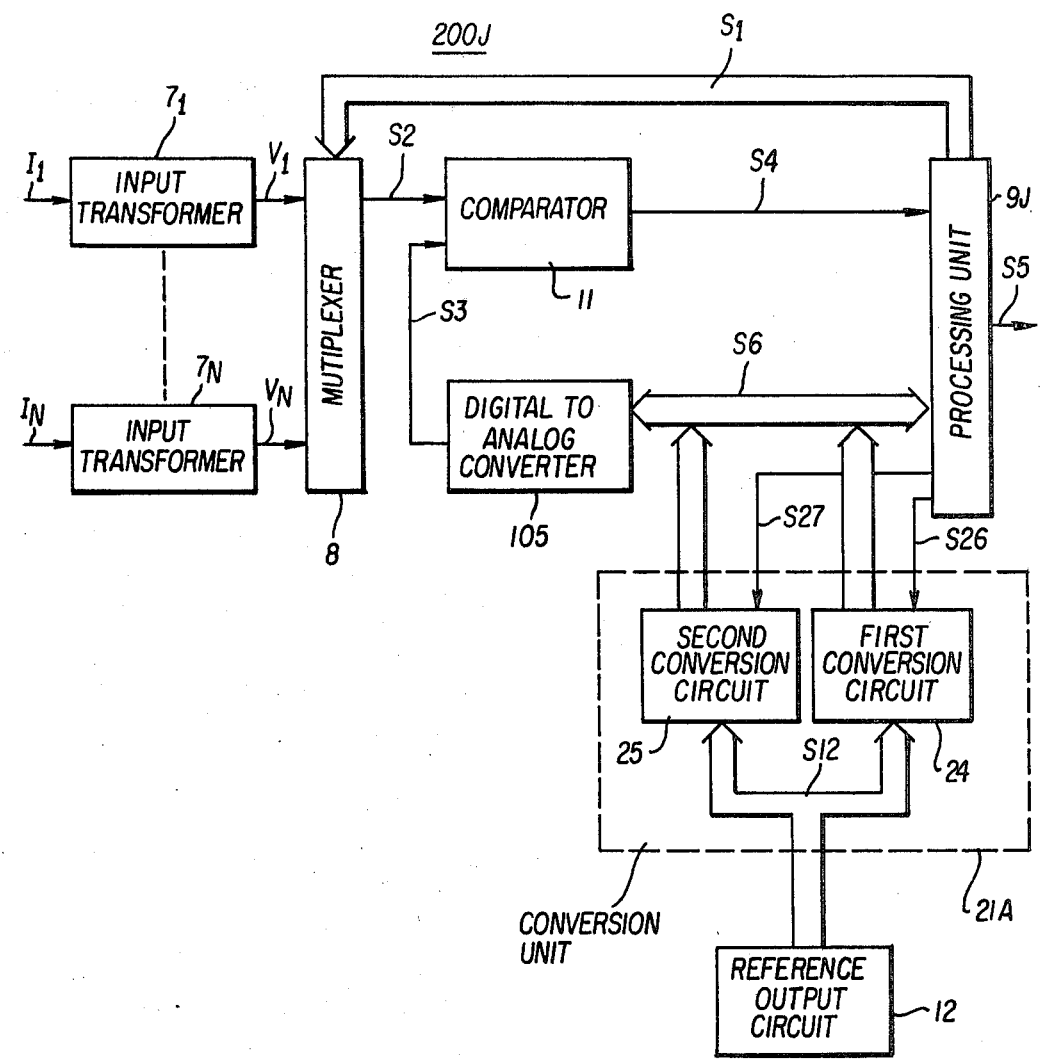

FIG. 13 shows a protective relaying system 200J according to still another embodiment of this invention. The system of FIG. 13 includes a processing unit 9J in place of the processing unit 9H shown in FIG. 11. The system also includes a conversion unit 21A having two conversion circuits, a first conversion circuit 24, and a second conversion circuit 25 in place of the conversion circuit 21 shown in FIG. 11. The first and second conversion circuits 24 and 25 are connected to the reference output circuit 12 for receiving the digital signal S12. The first conversion circuit 24 converts the digital signal S12 into a first reference signal which is the same conversion as performed in the conversion circuit 21 shown in FIG. 11. The second conversion circuit 25 converts the digital signal S12 into an inverted reference signal which is the two's complement value of the first reference signal of the first conversion circuit 24. The processing unit 9J also has the capability of producing a first permission signal S26 and a second permission signal S27. The first conversion circuit 24 is connected to the processing unit 9J for receiving the first permission signal S26 and generating the first reference signal thereof as the digital reference signal output S6 of the conversion unit 21A by receiving the first permission signal S26. The second conversion circuit 25 is connected to the processing unit 9J for receiving the second permission signal S27 and generating the inverted reference signal thereof as the digital reference signal output S6 of the conversion circuit 21A by receiving the second permission signal S27. The digital reference signal S6 is applied to both the processing unit 9J and the digital to analog converter 105. The remaining portions of the protective relaying system 200J are the same as those of the protective relaying system 200G shown in FIG. 11.

In the protective relaying system 200J shown in FIG. 13, the processing unit 9J can check the digital reference signal S6, which is the output signal of the first and second conversion circuits 24 and 25, by applying the first and second permission signals S26 and S27 and reading the digital reference signal S6. In making a relay decision, the processing unit 9J must generate the first permission signal S26 and the second permission signal S27; however, the process of converting the digital signal S12 is not necessary in the processing unit 9J. Therefore, a digital computer having a still lower processing capability than that of the processing unit 9G shown in FIG. 11 can be used as the processing unit 9J.

Figure 14:
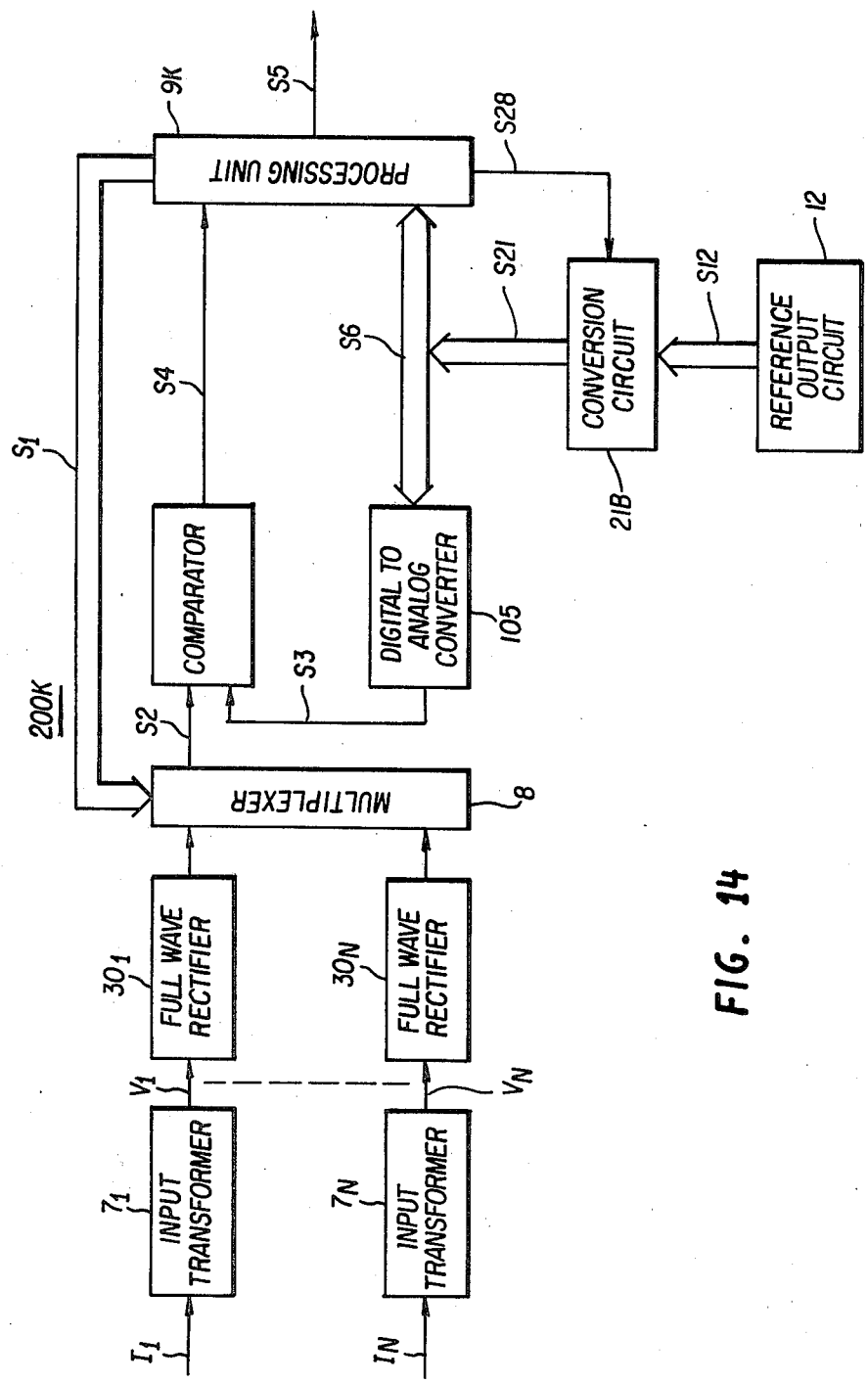

FIG. 14 shows a protective relaying system 200K according to a preferred embodiment of this invention. The system of FIG. 14 includes a processing unit 9K and a conversion circuit 21B in place of the processing unit 9G and the conversion circuit 21 shown in FIG. 11. The system also includes a plurality of full-wave rectifiers $30_1$ through $30_N$ located between the input transformers $7_1$ through $7_N$ and the multiplexer 8, respectively. The conversion unit 21B is connected to the reference output circuit 12 for receiving the digital signal S12 and converting the digital signal S12 into the first reference signal S21 as in the conversion circuit 21 shown in FIG. 11. The processing unit 9K also has the capability of producing a permission signal S28 which is applied to the conversion unit 21B. The conversion unit 21B generates the first reference signal S21 as the digital reference signal S6, which is applied to the processing unit 9K and the digital to analog converter 105 upon receiving the permission signal S28. The remaining portions of the protective relaying system 200K are the same as those of the protective relaying system 200G shown in FIG. 11.

In the protective relaying system 200K described above, since the selected input signal S2, which is applied to the comparator 11, is a full-wave rectified signal, as explained above with respect to the embodiment shown in FIG. 5, it is sufficient that the reference signal S3 generated by the digital to analog converter 105 has only one polarity. Therefore, the processing unit 9K produces the permission signal S28 so as to permit the conversion circuit 21A to generate the first reference signal S21 as the digital reference signal S6, and thus it is not necessary for the digital signal S12 to be converted in the processing unit 9K.

According to the protective relaying system 200K shown in FIG. 14, a digital computer having a still lower processing capacity than that of the processing unit 9G shown in FIG. 11 can be used to form the processing unit 9K as in the case of the processing unit 9J shown in FIG. 13. Moreover, the processing unit 9K can check the digital reference signal S6 which is applied to the digital to analog converter 105 by reading the digital reference signal S6. Also, an appropriate value for checking the system hardware can be applied to the comparator 11, thereby allowing the hardware in the protective relaying system 200K to be easily checked.

In the protective relaying systems 200G, 200H, 200J and 200K shown in FIGS. 11 through 14, only one reference output circuit is provided; however, a plurality of reference circuits can be provided in a protective relaying system which can make relay decisions regarding a plurality of types of relay elements and can reduce the size thereof as is apparent to those skilled in the art.

In the protective relaying system according to this invention, it is possible to provide a filter, which is usually used, where the fundamental wave component of the applied signal is picked up. In this case, the filter can be located between the input transformer and the multiplexer. This invention can also include a protective relaying system which has a band-rejection filter instead of the above-mentioned filter which detects faults, as is apparent to those skilled in the art.

Figure 15:
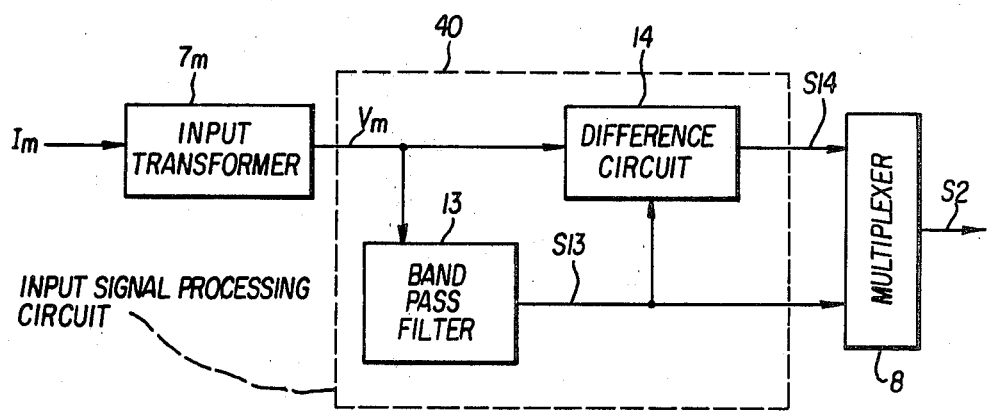
FIG. 15 is a block diagram showing an input signal processing circuit used between an input transformer and a multiplexer in the protective relaying system according to a preferred embodiment of this invention.

Moreover, an input signal processing circuit may be provided between the input transformer 7 and the multiplexer 8 in the protective relaying system according to this invention as shown in FIG. 15. The system of FIG. 15 includes a bandpass filter 13 and a difference circuit 14 in the input signal processing circuit 40. Input voltage or current information $I_m$ from the electric power system is applied to the input transformers 7m and converted into a voltage signal Vm. The bandpass filter 13 is connected to the input transformers 7m for receiving the voltage signal Vm. The filter 13 separates out the fundamental wave component of the voltage signal Vm to produce a filtered signal S13. The difference circuit 14 is connected to the input transformer 7m for receiving the voltage signal Vm and is also connected to the bandpass filter 13 for receiving the filter signal S13. The difference circuit 14 determines the fundamental wave component of the difference wave component between the voltage signal Vm and the filered signal S13 to produce a difference signal S14. The multiplexer 8 is connected to the bandpass filter 13 for receiving the filtered signal S13 and is also connected to the difference circuit 14 for receiving the difference signal S14. The multiplexer selects either the signal S13 or the signal S14 to produce the selected input signal S2.

In the protective relaying system having the input signal processing circuit 40 as shown in FIG. 15, when the filtered signal S13 is selected in the multiplexer 8, a relay decision can be made regarding the fundamental wave component of the relay input signal Im. When the difference signal S14 is selected in the multiplexer 8, a relay decision can be made regarding the variable component of the relay input signal Im. Therefore, a change in the relay input due to a fault in the electric power system can be detected. By combining two types of relay decision making capability as described above, the protective relaying system can be used to form a variable-width over-current relay and/or a variable-width under-voltage relay. Here the bandpass filter 13 and the difference circuit 14 can easily be formed using an operational amplifier, as is apparent to those skilled in the art.

FIG. 15 illustrates the case where the circuit 40 is provided for one relay input signal Im; however, a plurality of input signal processing circuits 40 can be provided for a plurality of relay input signals $I_1$ through $I_N$. Moreover, the comparator used in the embodiments described above compares voltages of applied signals; however, a comparator which compares applied current signals can be used, as is apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A protective relaying system comprising:
reference output circuit means for producing a digital signal;
conversion means coupled to said reference output circuit means for receiving said digital signal and for converting said digital signal into a reference signal;
processing means coupled to said conversion means for receiving said reference signal, for inverting said reference signal into an inverted reference signal, and for selecting one of said reference signal and said inverted reference signal to produce a digital reference output signal, said processing means including means for producing a selection signal;
selection means for receiving a plurality of input signals from a source, said selection means being coupled to said processing means for receiving said selection signal and for selecting one of said plurality of input signals to produce a selected input signal based on said selection signal;
digital to analog converter means coupled to receive said digital reference output signal from said processing means for converting said digital reference output signal into an analog reference signal; and
comparison means coupled to receive said selected input signal from said selection means and coupled to receive said analog reference signal from said digital to analog converter means for comparing said selected input signal with said analog reference signal and for producing a decision signal in digital form according to the result of the comparison;
wherein said processing means is coupled to receive said decision signal from said comparison means for processing said decision signal to produce a relay output signal.

2. A protective relaying system comprising:
reference output circuit means for producing a digital signal;
processing means including means for producing a permission signal and means for producing a selection signal;
conversion means coupled to receive said digital signal from said reference output circuit means and coupled to receive said permission signal from said processing means for converting said digital signal into a digital reference signal in response to said permission signal;
selection means coupled to receive a plurality of input signals from a source and coupled to receive said selection signal from said processing means for selecting one of said plurality of input signals to produce a selected input signal in response to said selection signal;
digital to analog converter means coupled to receive said digital reference signal from said conversion means for converting said digital reference signal into an analog reference signal; and
comparison means coupled to receive said selected input signal from said selection means and coupled to receive said analog reference signal from said digital to analog converter means for comparing said selected input signal with said analog reference signal and for producing a decision signal in digital form according to the result of the comparison;

wherein said processing means is coupled to receive said decision signal from said comparison means for processing said decision signal to produce a relay output signal.

3. The protective relaying system as recited in claim 2, wherein:

said processing means further includes means coupled to said conversion means for receiving said digital reference signal and for checking said digital reference signal.

4. The protective relaying system as recited in claim 3, wherein:

said permission signal includes a first enabling signal and a second enabling signal;

said conversion means includes a first conversion unit means and a second conversion unit means;

said first conversion unit means being coupled to receive said digital signal from said reference output circuit means and coupled to receive said first enabling signal from said processing means for converting said digital signal into a first reference signal in response to said first enabling signal;

said second conversion unit means being coupled to receive said digital signal from said reference output circuit means and coupled to receive said second enabling signal from said processing means for converting said digital signal to form an inverted reference signal in response to said second enabling signal;

said first reference signal and said inverted reference signal forming said digital reference signal.

5. A protective relaying system, comprising:

reference output means for producing a reference output signal;

processing means including means for producing a selection signal;

first selection means for receiving a plurality of input signals from a source, said first selection means being coupled to said processing means for receiving said selection signal and selecting one of said input signals to produce a selected input signal based on said selection signal; and comparison means coupled to receive said selected input signal from said first selection means and coupled to receive said reference output signal from said reference output means for comparing said selected input signal with said reference output signal and for producing a decision signal in digital form according to the result of the comparison;

wherein said processing means is coupled to receive said decision signal from said comparison means for processing said decision signal to produce a relay output signal; and wherein said processing means further includes means for producing a switching signal, and wherein said reference output means comprises, first reference unit means for producing a first reference signal, second reference unit means for producing a second reference signal, and switching means coupled to receive said first and second reference signals from said first and second reference unit means and coupled to receive said switching signal from said processing means for selecting one of said first and said second reference signals as said reference output signal under control of said switching signal.

6. The protective relaying system as recited in claim 5, wherein said first and second reference unit means each comprise:

a power source having first and second terminals;

an output terminal;

a first resistor coupled between said first terminal of said power source and said second output terminal;

a plurality of second resistors, each of said plurality of second resistors having first and second terminals, each of said first terminals of said plurality of second resistors being coupled to said output terminal; and second selection means coupled between said second terminal of said power source and said second terminals of said plurality of second resistors for selectively coupling each of said second terminals of said plurality of resistors to said second terminal of said power source.

7. The protective relaying system as recited in claim 3, which further comprises:

a plurality of full-wave rectifier means coupled between said source of said plurality of input signals and said selection means for full-wave rectifying said plurality of input signals.

8. The protective relaying system as recited in claim 7, which further comprises:

a plurality of input transformer means coupled between said source of said plurality of input signals and said plurality of full-wave rectifier means for converting said plurality of input signals into a plurality of transformed input signals having predetermined voltage levels.

9. A protective relaying system, comprising:

reference output means for producing a reference output signal;

processing means including means for producing a selection signal;

first selection means for receiving a plurality of input signals from a source, said first selection means being coupled to said processing means for receiving said selection signal and selecting one of said input signals to produce a selected input signal based on said selection signal; and comparison means coupled to receive said selected input signal from said first selection means and coupled to receive said reference output signal from said reference output means for comparing said selected input signal with said reference output signal and for producing a decision signal in digital form according to the result of the comparison:

wherein said processing means is coupled to receive said decision signal from said comparison means for processing said decision signal to produce a relay output signal; and wherein said processing means further includes means for producing a switching signal, and wherein said reference output means comprises, first reference unit means for producing a first reference signal, inverting means coupled to receive said first reference signal from said first reference means for inverting said first reference signal to produce an inverted reference signal, and switching means coupled to receive said first reference signal from said first reference unit means, coupled to receive said inverted reference signal from said inverting means, and coupled to receive said switching signal from said processing means for selecting either of said first reference signal and said inverted reference signal as said reference output signal under control of said switching signal.

10. The protective relaying system as recited in claim 9, wherein said first reference unit means comprises:
a power source having first and second terminals;
an output terminal;
a first resistor coupled between said first terminal of said power source and said output terminal;
a plurality of second resistors, each of said plurality of second resistors having first and second terminals, each of said first terminals of said plurality of second resistors being coupled to said output terminal; and
second selection means coupled between said second terminal of said power source and said second terminals of said plurality of second resistors for selectively coupling each of said second terminals of said plurality of resistors to said second terminal of said power source.

11. A protective relaying system, comprising:
processing means including means for producing a selection signal and means for producing a digital reference output signal;
selection means for receiving a plurality of input signals from a source, said selection means being coupled to said processing means for receiving said selection signal and selecting one of said input signals to produce a selected input signal based on said selection signal;
digital to analog converter means coupled to receive said digital reference output signal from said processing means for converting said digital reference signal into an analog reference signal; and
comparison means coupled to receive said selected input signal from said selection means and coupled to receive said analog reference signal from said digital to analog converter means for comparing said selected input signal with said analog reference signal and for producing a decision signal in digital form according to the result of the comparison;
wherein said processing means further includes,
means for producing a first reference signal,
means for inverting said first reference signal to form an inverted reference signal, and
switching means coupled to receive said first reference signal and said inverted reference signal for selecting one of said first reference signal and said inverted reference signal to form said digital reference output signal; and
wherein said processing means is coupled to receive said decision signal from said comparison means for processing said decision signal to produce a relay output signal.

12. The protective relaying system as recited in claim 11, which further comprises:
reference output circuit means for producing a digital signal;
wherein said means for producing said first reference signal in said processing means is coupled to receive said digital signal from said reference output circuit means for converting said digital signal into said first reference signal.

13. A protective relaying system comprising:
reference output circuit means for producing a digital signal;
processing means coupled to receive said digital signal from said reference output circuit means for converting said digital signal to produce a digital reference output signal, said processing means including means for producing a selection signal;
selection means for receiving a plurality of input signals from a source, said selection means being coupled to said processing means for receiving said selection signal and for selecting one of said plurality of input signals to produce a selected input signal based on said selection signal;
digital to analog converter means coupled to receive said digital reference output signal from said processing means for converting said digital reference output signal into an analog reference signal; and
comparison means coupled to receive said selected input signal from said selection means and coupled to receive said analog reference signal from said digital to analog converter means for comparing said selected input signal with said analog reference signal and for producing a decision signal in digital form according to the result of the comparison;
wherein said processing means is coupled to receive said decision signal from said comparison means for processing said decision signal to produce a relay output signal, wherein said processing means further includes means for producing a first read signal and a second read signal, and wherein said reference output circuit means comprises,
first reference unit means for producing a first digital reference signal,
second reference unit means for producing a second digital reference signal, and
means coupled to said processing means for receiving said first read signal and said second read signal, for selecting one of said first digital reference signal and said second digital reference signal in response to said first and second read signals to produce said digital signal.

14. A protective relaying system comprising:
reference output circuit means for producing a digital signal;
processing means coupled to receive said digital signal from said reference output circuit means for converting said digital signal to produce a digital reference output signal, said processing means including means for producing a selection signal;
selection means for receiving a plurality of input signals from a source, said selection means being coupled to said processing means for receiving said selection signal and for selecting one of said plurality of input signals to produce a selected input signal based on said selection signal;
digital to analog converter means coupled to receive said digital reference output signal from said processing means for converting said digital reference output signal into an analog reference signal;
comparison means coupled to receive said selected input signal from said selection means and coupled to receive said analog reference signal from said digital to analog converter means for comparing said selected input signal with said analog reference signal and for producing a decision signal in digital form according to the result of the comparison;
wherein said processing means is coupled to receive said decision signal from said comparison means for processing said decision signal to produce a relay output signal;

wherein said processing means further includes, means for producing a first write signal and a second write signal, said processing means converting said digital signal into an expanded digital signal having a longer bit length than the bit length of said digital signal, said processing means separating said expanded digital signal into a lower bit signal and an upper bit signal;

first latch means being coupled to receive said lower bit signal and said first write signal from said processing means for latching said lower bit signal to produce a lower bit reference signal upon receipt of said first write signal;

second latch means being coupled to receive said upper bit signal and said second write signal from said processing means for latching said upper bit signal to produce an upper bit reference signal upon receipt of said second write signal; and said digital to analog converter means being coupled to said first latch means for receiving said lower bit reference signal and coupled to said second latch means for receiving said upper bit reference signal as said digital reference output signal.

15. The protective relaying system as recited in claim 13, or 14, wherein said processing means further includes:

means for converting said digital signal into a first reference signal;

means for inverting said first reference signal to form an inverted reference signal; and switching means coupled to receive said first reference signal and said inverted reference signal for selecting one of said first reference signal and said inverted reference signal to form said digital reference output signal.

16. The protective relaying system as recited in claims 1, 4, 5, 9, 13 or 14, which further comprises:

a plurality of input transformer means coupled between said source of said plurality of input signals and said selection means for converting said plurality of input signals into a plurality of transformed input signals having predetermined voltage levels.

17. The protective relaying system as recited in claim 16, which further includes input signal processing means coupled between said plurality of input transformer means and said selection means, said signal processing means comprising:

bandpass filter means coupled to receive said plurality of transformed input signals from said plurality of input transformer means for filtering each of said plurality of transformed input signals and for producing a plurality of filtered input signals, said plurality of filtered input signals being supplied to said selection means; and difference circuit means coupled to receive said plurality of transformed input signals from said plurality of input transformer means and coupled to receive said plurality of filtered means for producing a plurality of difference input signals, said plurality of difference input signals being supplied to said selection means, each of said plurality of difference input signals being the difference between a corresponding one of said plurality of transformed input signals and a corresponding one of said polurality of filtered input signals.

18. A protective relaying system, comprising:

reference output means for producing a reference output signal;

processing means including means for producing a selection signal;

first selection means for receiving a plurality of input signals from a source, said first selection means being coupled to said processing means for receiving said selection signal and selecting one of said input signals to produce a selected input signal based on said selection signal; and comparison means coupled to receive said selected input signal from said first selection means and coupled to receive said reference output signal from said reference output means for comparing said selected input signal with said reference output signal and for producing a decision signal in digital form according to the result of the comparison;

wherein said processing means is coupled to receive said decision signal from said comparison means for processing said decision signal to produce a relay output signal only when said decision signal becomes a predetermined logic value consecutively for a predetermined number of times, and wherein said reference output means comprises, a power source having first and second terminals, an output terminal, a first resistor coupled between said first terminal of said power source and said output terminal, a plurality of second resistors, each of said plurality of second resistors having first and second terminals, each of said first terminals of said plurality of second resistors being coupled to said output terminal, and second selection means coupled between said second terminal of said power source and said second terminals of said plurality of second resistors for selectively coupling each of said second terminals of said plurality of resistors to said second terminal of said power source.

19. A protective relaying system, comprising:

reference output means for producing a reference output signal;

processing means including means for producing a selection signal;

selection means for receiving a plurality of input signals from a source, said selection means being coupled to said processing means for receiving said selection signal and selecting one of said input signals to produce a selected input signal based on said selection signal;

comparison means coupled to receive said selected input signal from said selection means and coupled to receive said reference, output signal from said reference output means for comparing said selected intput signal with said reference output signal and for producing a decision signal in digital form according to the result of the comparison;

a plurality of input transformer means coupled between said source of said plurality of input signals and said selection means for converting said plurality of input signals into a plurality of transformed input signals having predetermined voltage levels; and input signal processing means coupled between said plurality of input transformer means and said selection means, said signal processing means comprising, bandpass filter means coupled to receive said plurality of transformed input signals from said plurality of input transformer means for filtering each of said plurality of transformed input signals and for producing a plurality of filtered input signals, said plurality of filtered input signals being supplied to said selection means, and difference circuit means coupled to receive said plurality of transformed input signals from said plurality of input transformer means and coupled to receive said plurality of filtered input signals from said bandpass filter means for producing a plurality of difference input signals, said plurality of difference input signals being supplied to said selection means, each of said plurality of difference input signals being the difference between a corresponding one of said plurality of transformed input signals and a corresponding one of said plurality of filtered input signals;

wherein said processing means is coupled to receive said decision signal from said comparison means for processing said decision signal to produce a relay output signal only when said decision signal becomes a predetermined logic value consecutively for a predetermined number of times.

20. A protective relaying system, comprising:

processing means including means for producing a selection signal and means for producing a digital reference output signal;

selection means for receiving a plurality of input signals from a source, said selection means being coupled to said processing means for receiving said selection signal and selecting one of said input signals to produce a selected input signal based on said selection signal;

digital to analog converter means coupled to receive said digital reference output signal from said processing means for converting said digital reference signal into an analog reference signal;

comparison means coupled to receive said selected input signal from said selection means and coupled to receive said analog reference signal from said digital to analog converter means for comparing said selected input signal with said analog reference signal and for producing a decision signal in digital form according to the result of the comparison;

a plurality of input transformer means coupled between said source of said plurality of input signals and said selection means for converting said plurality of input signals into a plurality of transformed input signals having predetermined voltage levels; and input signal processing means coupled between said plurality of input transformer means and said selection means, said signal processing means comprising, bandpass filter means coupled to receive said plurality of transformed input signals from said plurality of input transformer means for filtering each of said plurality of transformed input signals and for producing a plurality of filtered input signals, said plurality of filtered input signals being supplied to said selection means, and difference circuit means coupled to receive said plurality of transformed input signals from said plurality of input transformer means and coupled to receive said plurality of filtered input signals from said bandpass filter means for producing a plurality of difference input signals, said plurality of difference input signals being supplied to said selection means, each of said plurality of difference input signals being the difference between a corresponding one of said plurality of transformed input signals and a corresponding one of said plurality of filtered input signals;

wherein said processing means is coupled to receive said decision signal from said comparison means for processing said decision signal to produce a relay output signal only when said decision signal becomes a predetermined logic value consecutively for a predetermined number of times.

21. A protective relaying system, comprising:

processing means including means for producing a selection signal and means for producing a digital reference output signal;

selection means for receiving a plurality of input signals from a source, said selection means being coupled to said processing means for receiving said selection signal and selecting one of said input signals to produce a selected input signal based on said selection signal;

digital to analog converter means coupled to receive said digital reference output signal from said processing means for converting said digital reference signal into an analog reference signal;

comparison means coupled to receive said selected input signal from said selection means and coupled to receive said analog reference signal from said digital to analog converter means for comparing said selected input signal with said analog reference signal and for producing a decision signal in digital form according to the result of the comparison; and reference output circuit means for producing a digital signal;

wherein said processing means further includes means coupled to said reference output circuit means for receiving said digital signal and for converting said digital signal into said digital reference output signal, and wherein said processing means is coupled to receive said decision signal from said comparison means for processing said decision signal to produce a relay output signal only when said decision signal becomes a predetermined logic value consecutively for a predetermined number of times.

22. The protective relaying system as recited in claims 2, 21, 13 or 14, which further comprises:

a plurality of full-wave rectifier means coupled between said source of said plurality of input signals and said selection means for full-wave rectifying said plurality of input signals.

23. The protective relaying system as recited in claims 11 or 12 which further comprises:

a plurality of input transformer means coupled between said source of said plurality of input signals and said selection means for converting said plurality of input signals into a plurality of transformed input signals having predetermined voltage levels.

24. The protective relaying system as recited in claim 22, which further comprises:

a plurality of input transformer means coupled between said source of said plurality of input signals and said plurality of full-wave rectifier means for converting said plurality of input signals into a plurality of transformed input signals having predetermined voltage levels.

25. The protective relaying system as recited in claim 23, which further includes input signal processing means coupled between said plurality of input transformer means and said selection means, said signal processing means comprising:

bandpass filter means coupled to receive said plurality of transformed input signals from said plurality of input transformer means for filtering each of said plurality of transformed input signals and for producing a plurality of filtered input signals, said plurality of filtered input signals being supplied to said selection means; and difference circuit means coupled to receive said plurality of transformed input signals from said plurality of input transformer means and coupled to receive said plurality of filtered input signals from said bandpass filter means for producing a plurality of difference input signals, said plurality of difference input signals being supplied to said selection means, each of said plurality of difference input signals being the difference between a corresponding one of said plurality of transformed input signals and a corresponding one of said plurality of filtered input signals.

* * * * *